June 10, 1941.  A. P. FERGUESON  2,244,872

SPARE WHEEL SHELF AND MOUNTING

Filed July 14, 1938   3 Sheets-Sheet 1

Inventor
ARTHUR P. FERGUESON.

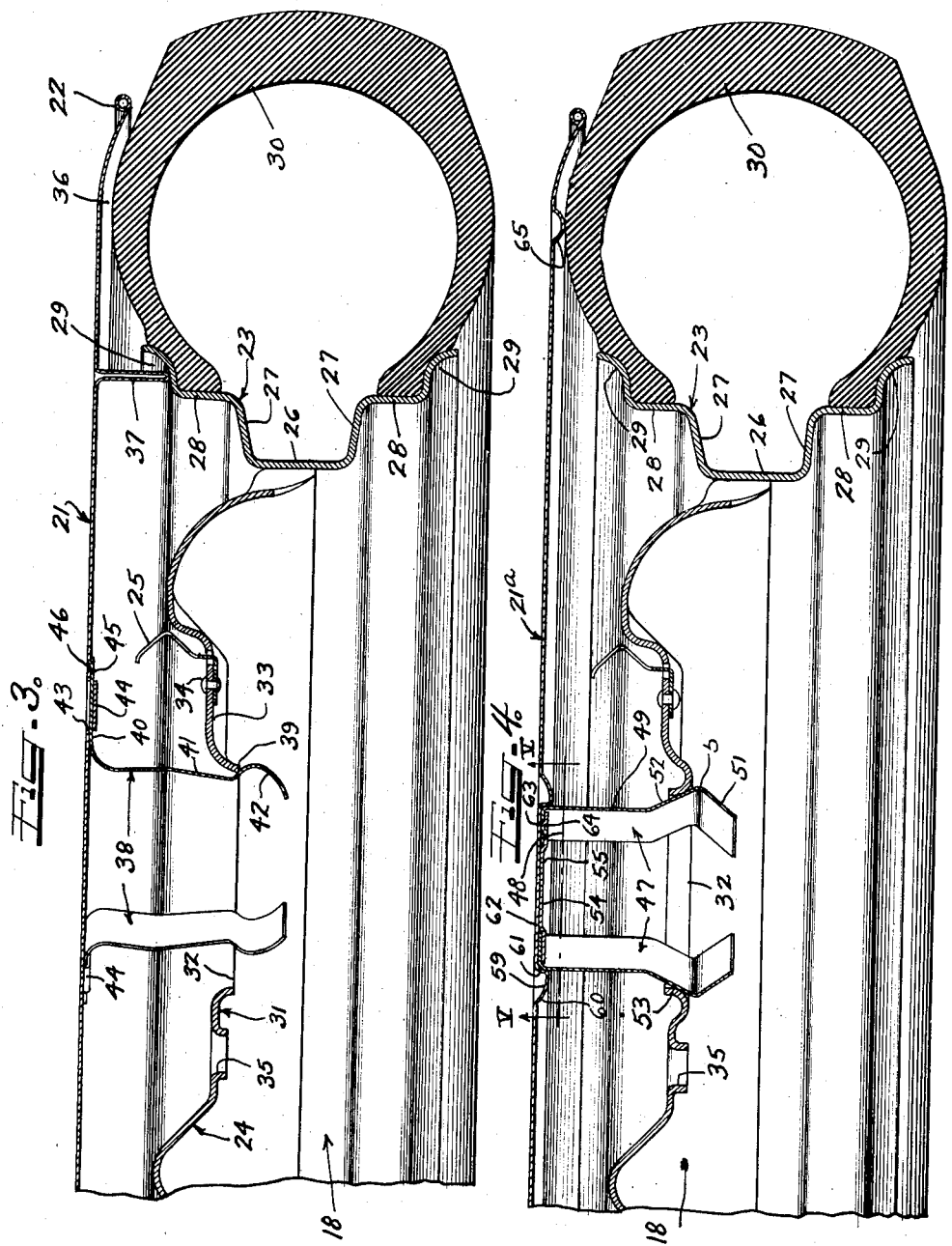

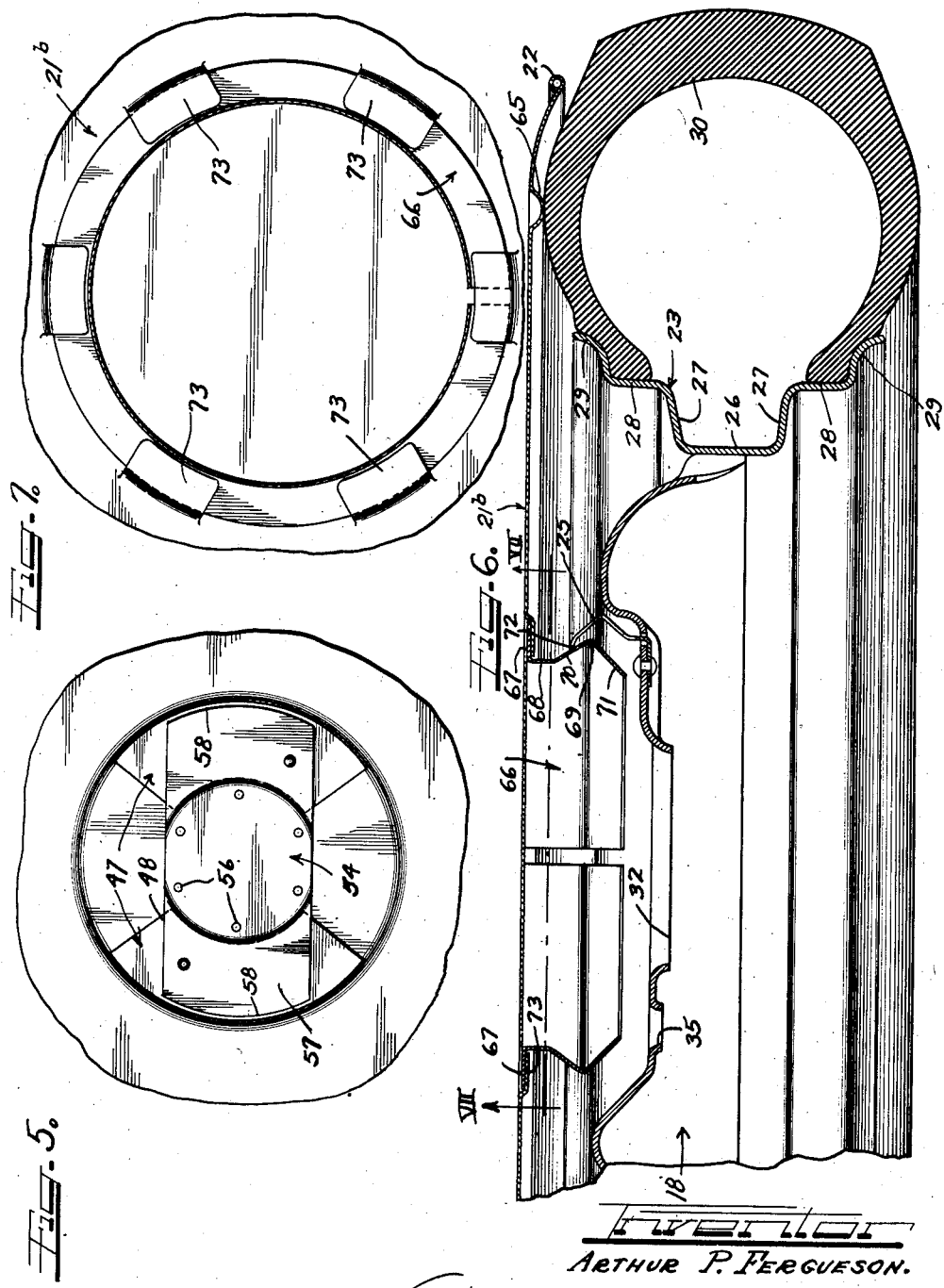

Patented June 10, 1941

2,244,872

UNITED STATES PATENT OFFICE 2,244,872

SPARE WHEEL SHELF AND MOUNTING

Arthur P. Fergueson, Detroit, Mich., assignor, by mesne assignments, to Houdaille-Hershey Corporation, Detroit, Mich., a corporation of Michigan Application July 14, 1938, Serial No. 219,166

2 Claims. (Cl. 224—29)

This invention relates to a spare wheel shelf and mounting, and more particularly to a novel luggage carrying and utility shelf adapted to be directly secured to and supported by the spare wheel carried in the luggage compartment of an automobile or vehicle.

In recent years, it has been the practice in the automobile trade to provide a luggage compartment in the rear portion of a vehicle body. This luggage compartment is usually arranged to have the spare tire and wheel carried on the floor thereof, a separate shelf being provided immediately above and in spaced relationship to the spare wheel and tire for the purpose of carrying luggage and other articles as desired. Since the amount of space which is available in the luggage compartment is necessarily limited, a continual effort has been made to increase the effective available space.

It is an object of the present invention to provide a novel arrangement which greatly increases the available space for luggage and other articles in a vehicle luggage and utility compartment which also houses and carries the spare tire and wheel of the vehicle.

Another object of the present invention is to provide a novel spare tire shelf and supporting arrangement therefor.

A further object of the present invention is to provide a novel luggage and utility shelf and mounting means therefor which permits the shelf to be directly mounted on a spare wheel or a tire and supported thereby.

A still further object of the present invention is to provide a novel spare tire shelf and mounting means therefor which is extremely economical to manufacture and which is rugged and reliable in use.

Another and further object of the present invention is to provide a novel form of spare tire shelf having a detachable mounting means thereon for directly securing the spare tire shelf to a spare wheel.

Another and still further object of the present invention is to provide a novel form of mounting means for spare tire shelves which is carried by the spare tire shelf in a novel manner.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 3 is an enlarged sectional view of a vehicle wheel with the spare tire shelf and mounting illustrated in Figure 2 mounted thereon;

Figure 4 is an enlarged sectional view similar to Figure 3, illustrating a different embodiment of the present invention;

Figure 5 is an enlarged cross-sectional view of the embodiment of the invention illustrated in Figure 4, taken along line V—V of Figure 4;

Figure 6 is an enlarged sectional view similar to Figure 3 illustrating another embodiment of the present invention;

Figure 7 is an enlarged cross-sectional view of the embodiment illustrated in Figure 6 taken along the line VII—VII thereof.

Figure 1:
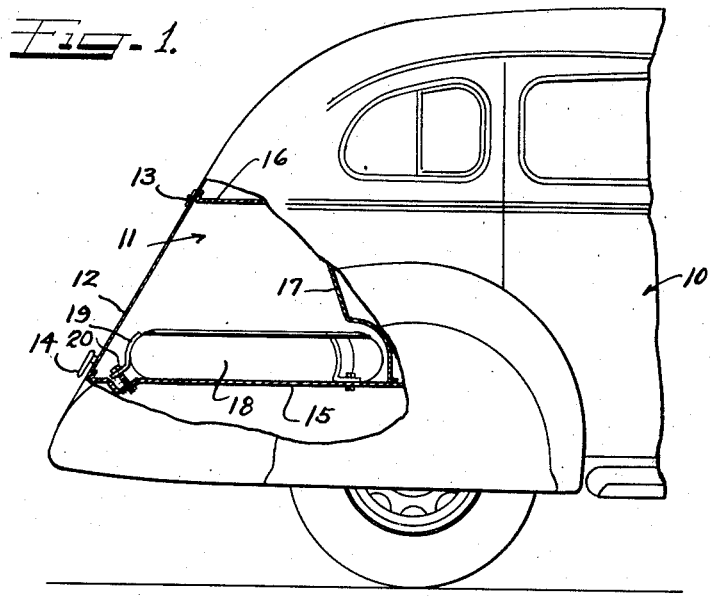
Figure 1 is a side elevational view of the rear part of an automobile with a portion of the body thereof broken away to illustrate a spare tire shelf directly mounted on a spare wheel.

In Figure 1 of the drawings, an automobile 10 is shown, having a luggage compartment 11 on the rear portion of its body which is accessible through a hinged door 12. As is the common practice of the present day, the door 12 is hinged along its top edge by suitable hinge members 13, and is provided with the usual latch mechanism 14 at its lower edge for fastening of the door 12 in place. The compartment 11 also includes a floor 15, a roof or top wall 16 and a rear wall 17.

The car 10 is equipped with a spare wheel 18, which is carried on the floor 15 of the compartment 11 and is detachably held in place by one or more clamping arms 19, which are bolted to the floor 15 in any suitable manner, such as by means of bolts 20. In view of the fact that the width of the compartment 11 is substantially greater than the width of the wheel 18, it will of course be appreciated by those skilled in the art that the wheel may be located either in a central position with respect to the side walls (not shown) of the compartment 11, or it may be located at one side of the compartment. It is to be understood, however, that the exact positioning of the spare wheel within the compartment forms no part of the present invention, and therefore may vary through wide limits without departing from the spirit and scope of the present invention.

It has been the usual practice in the past to provide a permanent shelf in the luggage compartment disposed in parallel spaced relationship above the spare wheel for the reception of luggage and other articles. It has been found, however, that an extremely effective and novel arrangement is obtained by providing a luggage and utility shelf which is directly mounted on and detachably secured to the spare wheel. This arrangement greatly increases the effective usable space for luggage and other articles as will at once be apparent from an inspection of the drawings.

It has further been found that in order to minimize manufacturing costs as much as possible and also to minimize shipping expense of the finished article, it is highly desirable to provide a mounting means for the spare tire shelf which is detachably secured thereto. This permits the mounting means to be shipped separately from the shelf proper.

Figure 2:
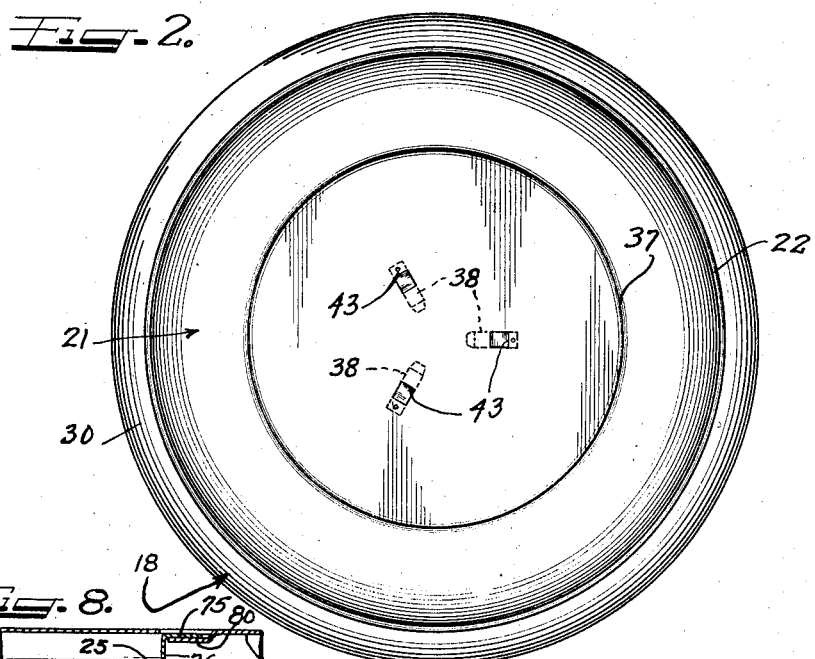
Figure 2 is a plan view of one embodiment of a spare tire shelf and mounting therefor.

One embodiment of the present invention is illustrated in Figures 2 and 3 of the drawings. As shown therein, a sheet metal luggage and utility shelf 21 is provided which is preferably formed of sheet metal stock having a circular outer rolled edge 22. This circular outer rolled edge 22 acts as a reinforcing bead or rail and serves primarily to stiffen the shelf. The spare tire shelf 21 is arranged to be mounted on the spare wheel 18 which is illustrated as being of a conventional type, including a rim portion 23 and a body portion 24, the latter being equipped with the usual hub cap retaining spring fingers 25. The rim 23 is of the drop-center type and includes a base flange 26, opposite side flanges 27, opposite intermediate flanges 28, and opposite edge portions 29. A spare tire 30 is shown mounted on the drop-center rim 23 in the conventional manner.

The wheel body part 24 includes a plurality of fastening portions 31 which are disposed in annular spaced relationship radially outwardly of the central opening 32 of the wheel. Alternately spaced with the wheel mounting or fastening portions 31 are a plurality of raised portions 33 to which the hub cap fingers are riveted or otherwise suitably secured, as at 34. The mounting or fastening portions 31 are apertured as at 35 for the reception of the wheel mounting bolts (not shown) which secure the wheel to the vehicle.

The spare tire shelf 21 is specifically arranged to be directly supported by the spare wheel 18 and to be detachably secured thereto by novel mounting means. In supporting the spare tire shelf 21 on the spare wheel 18 it has been found desirable either to slightly space the shelf from the tire 30 to allow for growth of the tire, due to the aging of the rubber over a long period of time, or else to provide the mounting means with means for taking into account the growth of the tire and yet maintain the detachable connection with the spare wheel 18 unimpaired. In the embodiment of the invention illustrated in Figures 2 and 3 of the drawings, the spare tire shelf is arranged to be seated on the rim 23 of the spare wheel 18 and the shelf proper is arranged to be slightly spaced from the tire 30, as at 36. More specifically this is provided by forming a folded flange 37 in the spare tire shelf 31 at a point opposite the edge portion 29 of the rim 23. The flange 37 may be formed in any suitable manner, such as by means of a rolling operation or by means of a collapsing operation. The depth of the flange 37 is such that a slight space 36 is maintained between the tire 30 and the portion of the spare tire shelf 21 disposed thereabove.

The mounting means for detachably securing the spare tire shelf 21 to the spare wheel 18 includes a plurality of substantially L-shaped spring fingers 38, which are arranged to extend through the opening 32 of the spare wheel 18 and engage the opening defining edge 39 of the wheel body part 24. The spring fingers 38 include a base portion 40 and an axially extending portion 41, the latter terminating in a hump-shaped end portion 42 which is arranged to be cammed through the opening 32 defined by the edge 39 into fastening engagement with the wheel body part 24 of the spare wheel 18.

Two longitudinal cuts 43 are made in the spare tire shelf 21 opposite the base portion 40 of each spring element 38 in a direction transverse to the direction of extension of the base portion 40. The portions of metal 44 lying between the cuts 43 are depressed to a point slightly below the undersurface of the spare tire shelf 21 to permit the base portions 40 of the spring elements 38 to pass between the depressed portions 44 and the undersurface of the spare tire shelf 21. The base portion 40 of each spring element 28 is apertured as at 45 in proximity to the outer extremity of the base portion 40 and a small protuberance 46 is formed in the spart tire shelf opposite the aperture 45 to extend therein and detachably retain the spring element 38 in position.

From the above description it will at once be apparent that the spring fingers 38 may be readily removed from the spare tire shelf 21 by simply pulling radially inwardly thereon with sufficient force to disengage the protuberance 46 of the spare tire shelf 21 from its engagement with the base portion 40 in the aperture 45. The spring element 38 may thereafter be slid away from its position between the depressed portion 44 and the undersurface of the spare tire shelf 21. To reassemble the spring fingers 38 in desired position on the spare tire shelf 21, it is simply necessary to push the base portion 40 in between the depressed portions 44 on the under surface of the spare tire shelf 21 until the aperture 45 of the base 40 passes into position over the protuberance 46. The spare tire shelf 21 may then be moved into position on the spare wheel 18 by simply pushing the shelf 21 axially toward the spare wheel 18 until the spring fingers 38 are cammed through the opening 32 of the body part 24 of the wheel 18. The folded flange 37 limits the downward movement of the spare tire shelf 21 by virtue of its engagement with the outer edge portion 29 of the drop-center rim 23. Due to the fact that the spare tire shelf 21 is slightly spaced from the tire 30, as at 36, growth of the tire, due to aging, will not affect the engagement of the spring fingers 38 with the opening defining edge 39 of the wheel. It will furthermore be observed that due to the fact that the spare tire shelf 21 is closely mounted on the spare wheel 18, the amount of available space in luggage compartment 11 of the automobile 10 is materially increased. It will also be understood that by virtue of the fact that the spring fingers 38 are removable from the spare tire shelf 21, the shelves 21 may be packed in a minimum amount of space and thus reduce shipping costs to a minimum.

In Figures 4 and 5 of the drawings, I have illustrated a second embodiment of my invention.

More specifically, two arcuate-shaped flange plates 47 are employed to detachably secure the spare tire shelf 21ª to the spare wheel 18. As shown in the drawings, two arcuate-shaped flanges 47 are provided for the spare tire shelf 21, each including a base portion 48 and an axially extending portion 49. The axially extending portion 49 is terminated in a hump shaped end portion 50 which provides the necessary cam surface 51 for camming the flanges 47 through the central opening 32 of the wheel and an attaching surface 52 which provides the necessary friction engaging attaching surface for detachably holding the spare tire shelf 21ª in desired position on the wheel.

As shown in Figure 4, the spare wheel 18 is substantially the same as the spare wheel shown in Figure 3 of the drawings, with the exception that the central opening 32 of the wheel is defined by an axially outwardly turned opening defining edge 53, instead of an axially inwardly opening defining edge 39, as is illustrated in Figure 3. It is to be understood, however, that the spare tire shelf 21ª, as shown in Figures 4 and 5, may be mounted equally well on a wheel of the form shown in Figure 3, and indeed the specific form of the wheel is immaterial to the carrying out of the present invention, so long as it has the necessary portions thereon for engagement with the mounting means of the spare tire shelf.

The arcuate shaped resilient flanges 47 are detachably secured to the spare tire shelf 21ª in a novel manner. An attaching plate 54, having a raised central portion 55 is spot-welded or otherwise suitably secured to the undersurface of the spare tire shelf 21, as at 56. As may be seen best in Figure 5, the attaching plate 54 is considerably narrower than it is long. The end portions 57 of the attaching plate 54 are curved, as at 58, at their outer edge. The spare tire shelf 21ª is provided with an annular groove 59 having a gradually sloping wall portion 60 and an abruptly sloping wall portion 61. The arcuate shaped attaching flanges 47 are arranged to be seated on the undersurface of the spare tire shelf 21ª inwardly of the wall portion 61, the junction of the base portion 48 and the axially extending portion 49 thereof being seated against the undersurface of the spare tire shelf 21ª and the wall portion 61. The central portion of the spare tire shelf 21ª, which is indicated by the reference number 62 is spaced from the end portion 57 of the attaching plate 55 for reception of the base portion 48 of each arcuate attaching flange 47.

By virtue of the fact that the width dimension of the attaching plate 54 is substantially less than the diameter of the central portion 62 of the spare tire shelf 21ª, it will be apparent that the arcuate shaped flange may be slid in between the spaced end portions 57 of the attaching plate 54 and the spare tire shelf 21 by first disposing the arcuate shaped attaching flange 47 in a position substantially 90° from its final position, as shown in Figure 5, and then rotating it or sliding it along the wall portion 61 into position between the end portion 57 and the central portion 62 of the spare tire shelf 21. The base portion 48 of each arcuate shaped attaching flange 47 is provided with an aperture 63 which is arranged to engage a protuberance 64 formed in the end portion 57 of the attaching plate 54. The engagement of the protuberance 64 with the aperture 63 restrains further movement of the attaching flange 47 after it has once been moved into position, although it permits detachment of the attaching flange 47 at any subsequent time when a sufficient force is applied to cause a flexure of the end portion 57 to permit the protuberance 64 to ride out of engagement with the aperture 63.

In the form of the invention as shown in Figure 4 of the drawings, the spare tire shelf 21ª is also provided with an annular downwardly extending bead 65 which is arranged to directly engage the tire 30 and support the shelf. The hump-shaped end portion 50 of each attaching flange 47 is so arranged that as the tire 30 expands due to an age growth, the attaching surface 52 moves upwardly, but not to a sufficient extent to pass the high point of the hump of the end portion 50. The detachable engagement of the attaching flange 47 with the spare wheel 18 is, therefore, not impaired, due to the growth of the tire in aging, in spite of the fact that the spare tire shelf 21ª is directly supported thereon.

In Figures 6 and 7 of the drawings a third embodiment of the present invention is illustrated. In this form of the invention as in the two previous forms, the attaching or mounting means is arranged to be detachably secured to the spare tire shelf 21. The specific form of attaching means employed in this form of the invention, however, is in the nature of a slit ring 66, which is arranged to engage the hub cap springs 25 rather than extending through the central opening 32 of the wheel. The specific form of spare wheel 18 illustrated in Figure 6 is the same as the form of spare wheel which has been illustrated and described in connection with Figure 3. The outer portion of the spare tire shelf 21ᵇ illustrated in Figure 6 is the same as that illustrated and described in connection with Figure 4 and includes an annular bead 65, which is arranged to directly engage the tire 30 to support the shelf thereon.

The spare tire shelf mounting means illustrated in Figures 6 and 7 of the drawings includes a slit ring 66 having a base portion 67, an axially extending portion 68, and a hump shaped end portion 69, the latter being provided by an obliquely radially outwardly and axially inwardly extending portion 70 and an obliquely radially inwardly and axially inwardly extending portion 71. As is clearly shown in Figure 6 of the drawings, the slit ring 66 is arranged to pass radially inwardly of the free end 72 of each spring 25 so that the raw end 72 of the spring 25 engages the sloping surface 70. This has been found preferable to causing the slit ring 66 to pass radially outwardly over the hub cap springs 25, as is the usual method for securing a hub cap to the wheel in order that the growth of the tire 30, due to aging, will not materially impair the engagement of the slit ring attaching flange 66 with the hub cap springs 25.

The split ring attaching flange 66 is detachably secured to the spare tire shelf 21ᵇ by striking a plurality of tabs 73 from the spare tire shelf 21ᵇ and causing them to be spaced slightly below the undersurface of the spare tire shelf 21ᵇ. Due to the fact that the attaching flange 66 is in the form of a split ring, it will readily be observed that it may be worked under the tabs 73 into detachable engagement with the spare tire shelf 21ᵇ. It will thus be observed that the spare tire shelf may be shipped independently of the attaching flange or member 66 and thereby effect the usual economy in shipping costs due to minimizing the amount of space required to pack the article. When it is desired to assemble and mount the spare tire shelf 21ᵇ on the spare wheel 18, it is simply necessary to work the slip ring attaching flange 66 in under the tabs 67 and then push the spare tire shelf 21ᵇ axially inwardly (that is, downwardly, as viewed in Figure 6 of the drawings) until the hump shaped end portion 69 of the split ring 66 has passed under the end 72 of each hub cap spring 25 and until the annular bead 65 bears against the side wall of the tire 30.

Figure 8:
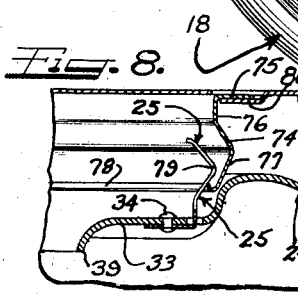
Figure 8 is an enlarged fragmentary sectional view of a modified form of the structure shown in Figure 3.

In Figure 8 a modified form of the structure shown in Figure 3 of the drawings is illustrated. More particularly, a split ring attaching flange or collar 74 is employed in the place of the attaching fingers 38 to detachably secure to the wheel a spare wheel shelf 21ᶜ of the type having a spacing and positioning flange such, for example, as the folded flange 37 of Figure 3. The split ring attaching flange or collar 74 includes a base flange portion 75 and a generally axially extending portion 76 which terminates in an obliquely radially inwardly and axially rearwardly extending portion 77 having an inturned edge 78. The inturned edge 78 is arranged to be cammed over the radial outermost portion 79 of the hub cap springs 25. The base portion 75 is detachably secured to the spare wheel shelf 21ᶜ by means of a plurality of depressed radially inwardly extending tabs 80 in the same manner that the split ring attaching flange 66 is secured to the spare wheel shelf in Figure 7 of the drawings. Due to the fact that the spacing of the spare tire shelf 21ᶜ from the spare wheel 18 is fixed because of the spacing and positioning flange on the spare tire shelf 21ᶜ, it is clear that this type of engagement is highly satisfactory and provides a firm and secure engagement of the spare tire shelf 21ᶜ on the spare wheel 18.

From the above description, it will readily be apparent that I have provided a novel form of spare tire shelf and mounting means therefor which is economical to manufacture and which is rugged and reliable in use. It will further be observed that by virtue of the fact that the mounting means is detachable from the spare tire shelf proper, that shipping costs and the like are greatly reduced, due to the resulting economy of space in packing.

While I have shown particular embodiments of my invention it will, of course, be understood that I do not wish to be limited thereto, since many modifications may be made, and I therefore contemplate by the appended claims to cover all such modifications as fall within the true spirit and scope of my invention.

I claim as my invention:

1. A luggage and utility shelf of the type arranged to be seated on and supported by a substantially horizontally disposed wheel, said shelf having a centrally disposed axially extending annular wall portion forming a shallow circular recess, a mounting plate secured to said shelf within said recess, the ends of said plate being spaced from and in close proximity to said wall portion, and the sides of said plate being spaced a substantial distance from said wall portion, the end portions of said plate also being spaced from the under surface of said shelf, and a pair of arcuate shape axially projecting wheel attaching flanges each having a base portion arranged to be rotated into snug shelf engaging position between said end portions of said mounting plates and said shelf.

2. A luggage and utility shelf of the type designed to be seated on and supported by a horizontally disposed spare wheel and tire comprising a sheet metal disc having a generally flat central portion, said central portion being formed with an annular boss having a steep inner wall forming the sides of a shallow flat-bottomed circular recess on the underside of said disc, a retaining member secured to the central portion of the base of said recess and having a portion spaced from and parallel to said base and extending towards the side of said recess, and a sheet metal wheel-engaging member having an upright portion projecting down from one side of said recess and a horizontal base portion at the upper end of said upright portion, said upright portion being arcuate in cross section and fitting against the side of said recess and said base portion being flat and fitting between said portion of the retaining member spaced from the base of the recess and the base of said recess whereby said wheel-engaging member may be revolved relative to said disc about the axis of said circular recess and the base portion of said wheel-engaging member may be rotatively slid out from between said retaining member and the base of said recess for permitting the detaching of said wheel-engaging member from said disc.

ARTHUR P. FERGUESON.